US010449966B2

(12) United States Patent
Willimowski et al.

(10) Patent No.: US 10,449,966 B2
(45) Date of Patent: Oct. 22, 2019

(54) METHOD FOR REDUCING NITROGEN OXIDE EMISSIONS OF A DIESEL VEHICLE

(71) Applicant: Robert Bosch GmbH, Stuttgart (DE)

(72) Inventors: Markus Willimowski, Friberg A.N. (DE); Harald Ryll, Stuttgart (DE); Walter Lehle, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 15/820,167

(22) Filed: Nov. 21, 2017

(65) Prior Publication Data
US 2018/0154897 A1 Jun. 7, 2018

(30) Foreign Application Priority Data

Dec. 5, 2016 (DE) .................. 10 2016 224 135

(51) Int. Cl.
*B60W 30/188* (2012.01)
*B60W 10/06* (2006.01)
(Continued)

(52) U.S. Cl.
CPC .......... *B60W 30/188* (2013.01); *B60W 10/06* (2013.01); *B60W 10/10* (2013.01); *B60W 30/1882* (2013.01); *B60W 50/10* (2013.01); *B60W 50/12* (2013.01); *B60W 50/14* (2013.01); *F01N 3/00* (2013.01); *F01N 9/005* (2013.01); *F01N 11/00* (2013.01); *B60W 50/16* (2013.01); *B60W 2050/143* (2013.01);
(Continued)

(58) Field of Classification Search
None
See application file for complete search history.

(56) References Cited

U.S. PATENT DOCUMENTS

2008/0295493 A1* 12/2008 Applegate .............. B60K 6/485
60/286
2009/0133384 A1* 5/2009 Devarakonda .......... F01N 3/106
60/276
(Continued)

FOREIGN PATENT DOCUMENTS

DE 19728343 C1 4/1999
DE 19755600 A1 7/1999
(Continued)

*Primary Examiner* — Justin Holmes
(74) *Attorney, Agent, or Firm* — Norton Rose Fulbright US LLP; Gerard Messina

(57) ABSTRACT

A method for reducing nitrogen oxide emissions of a diesel vehicle. In this context, first state variables of the diesel vehicle are measured with the aid of sensors of the diesel vehicle, and using an arithmetic unit, it is ascertained, as a function of the first state variables, if the nitrogen oxide emissions are exceeding a predetermined threshold, or using the arithmetic unit, it is predicted, as a function of the first state variables, if the nitrogen oxide emissions will exceed the predetermined threshold. If exceedance of the threshold is calculated or predicted, then an intervention in the current torque demand of the diesel vehicle and/or an intervention in the current transmission ratio or setting of a transmission of the diesel vehicle is ascertained by the arithmetic unit; the intervention contributing to a reduction in the nitrogen oxide emissions to a value below the threshold.

23 Claims, 3 Drawing Sheets

(51) Int. Cl.
  *B60W 10/10* (2012.01)
  *B60W 50/12* (2012.01)
  *B60W 50/14* (2012.01)
  *B60W 50/10* (2012.01)
  *F01N 11/00* (2006.01)
  *F01N 9/00* (2006.01)
  *F01N 3/00* (2006.01)
  *B60W 50/16* (2012.01)

(52) U.S. Cl.
  CPC . *B60W 2050/146* (2013.01); *B60W 2510/068* (2013.01); *B60W 2510/1005* (2013.01); *B60W 2530/12* (2013.01); *B60W 2540/10* (2013.01); *B60W 2710/0644* (2013.01); *B60W 2710/0666* (2013.01); *B60W 2710/1005* (2013.01); *B60Y 2300/474* (2013.01); *B60Y 2400/432* (2013.01); *F01N 2430/00* (2013.01); *F01N 2570/14* (2013.01); *F01N 2900/0412* (2013.01); *F01N 2900/08* (2013.01); *F01N 2900/10* (2013.01); *F01N 2900/102* (2013.01); *F01N 2900/1402* (2013.01); *F01N 2900/1411* (2013.01); *Y02T 10/54* (2013.01)

(56) References Cited

U.S. PATENT DOCUMENTS

2015/0275800 A1\* 10/2015 Stenlaas ............ B60W 10/00 123/676
2017/0305411 A1\* 10/2017 Leone ................ B60W 10/06

FOREIGN PATENT DOCUMENTS

DE   102007048130 A1   4/2009
DE   102007062704 A1   7/2009

\* cited by examiner

METHOD FOR REDUCING NITROGEN OXIDE EMISSIONS OF A DIESEL VEHICLE

CROSS REFERENCE

The present application claims the benefit under 35 U.S.C. § 119 of German Patent Application No. DE 102016224135.4 filed on Dec. 5, 2016, which is expressly incorporated herein by reference in its entirety.

FIELD

The present invention relates to methods for reducing nitrogen oxide emissions of a diesel vehicle, as well as to a computer program or devices, which are configured to implement such methods.

BACKGROUND INFORMATION

Different methods for reducing nitrogen oxide emissions in diesel vehicles are available, e.g., selective catalytic reduction (see, e.g., German Patent Application Nos. DE 197 28 343 C1, DE 10 2007 062 704 A1) or catalytic converters having a hydrocarbon trap (see, e.g., German Patent Application No. DE 197 55 600 A1).

A device and a method for measuring and indicating environmental contributions of a vehicle are described in German Patent Application No. DE 10 2007 048 130 A1. The device may also have an ecological driving-instructor function.

SUMMARY

The present invention relates to a method, a computer program, and a device configured to execute the method.

In this context, the starting point is a diesel vehicle, whose nitrogen oxide emissions should be reduced. To this end, in accordance with the present invention, it is provided that an arithmetic unit ascertains, as a function of sensor measurements and information about the current condition of the vehicle determined from them, if a predetermined threshold has been or threatens to be exceeded. In this case, the arithmetic unit determines interventions in a torque demand or in a transmission ratio or setting, which are suitable to prevent the threshold from being exceeded or to limit an increase in the emissions. This procedure has the advantage that in addition to the actual operating strategy of a vehicle, which may be optimized to other variables such as fuel consumption, ride comfort and further environmental variables, a check is made that the variable of nitrogen oxide emission critical for diesel vehicles may be limited. This may be important, for example, in non-optimal operating conditions of an NOx exhaust-gas aftertreatment system used independently of this, e.g., in the case of non-optimal operating temperatures. Particularly, in such operating conditions, e.g., during and after a cold start, the driver may contribute significantly to reducing nitrogen oxide emissions through his/her driving style, and accordingly, the proposed interventions also have a considerable effect, particularly in these situations. In addition, the use in systems not having an NOx exhaust-gas aftertreatment system is particularly advantageous, since the nitrogen oxides of gas exiting the exhaust system into the environment are equally reduced by reducing the emissions of untreated nitrogen oxides.

The ascertained intervention may take place in the vehicle in an automated manner, preferably through a torque intervention by a control unit or a shifting command to an automatic transmission.

The advantage of this is that a limitation of emissions or of an increase in emissions by the system is ensured independently of a driving behavior of a driver.

As an alternative, the intervention may also take place in the form of an instruction to a driver, in particular, as information in real time. This may be accomplished, e.g., by a haptic actuator in the vehicle, for example, a vibrating operating element such as a steering wheel or an active accelerator pedal. Acoustic or visual instructions are also possible. One advantage of this embodiment is that no automatic intervention in the vehicle control system is carried out, and consequently, the ride comfort of the driver is maintained in light of the existing optimization. Compliance with the threshold by the emissions is made the responsibility of the driver, to whom the actions by which he or she may keep the emissions below the critical threshold are clearly indicated (e.g., by decreasing the accelerator position or by a specific change of gears).

Exceedance of a threshold value may be calculated or predicted in a particularly efficient and rapid manner, if a previously measured characteristics map for this is used. The advantage of this is that the interventions and/or driving recommendation may be made in such a timely manner, that emissions are reduced or an overly sharp increase in the emissions and the environmental impact associated with them are prevented. In particular, the engine speed and the mean pressure of the engine have proven to be suitable and reliable input variables for a calculation and/or such a characteristics map. The optional use of an additional, second characteristics map, which takes into account reduced exhaust-gas recirculation rates during an acceleration event, has the advantage that in the case of acceleration events, the nitrogen oxide calculations may consequently be made more accurately.

In a further preferred refinement, a driving evaluation regarding the nitrogen oxide emissions, with the aid of which the interventions may be determined even more selectively and efficiently, takes place in light of the frequency of and/or of the instances of threshold exceedance.

In order to give the driver a feeling for the effect of his/her driving style on the nitrogen oxide emissions and to give the driver an indication of an imminent action or a driving recommendation to be expected soon, the current emissions may also be visualized for him/her, optionally, inclusive of the predetermined threshold.

Preferably, in the selection of the actions, the fuel consumption associated with them is also considered, in order that the actions do not have unnecessarily negative effects in a different area. Preferably, no interventions are carried out in particular driving situations, (e.g., on a hill, in the case of additional vehicle loading, while starting up, etc.), in order to not reduce the ride comfort overly sharply.

The example methods of the present invention may be implemented in a purely internal vehicle system, in which an arithmetic unit of a vehicle control unit takes on the calculations and initiates the actions. As an alternative, and particularly suitable as a retrofitted solution, an implementation may take place, using a communications control unit (CCU), which is connected to the vehicle, but external, as well as a device that is connected, in turn, to the CCU and has an HMI (e.g., a navigation device, a smartphone or another mobile device having a display). Such a retrofitted solution is considerably more favorable than retrofitting an (also additional) exhaust-gas aftertreatment system and may nevertheless contribute significantly to reducing nitrogen oxide emissions of the retrofitted diesel vehicles.

BRIEF DESCRIPTION OF THE DRAWINGS

Below, the present invention is described in more detail with reference to the figures and in light of exemplary embodiments.

DETAILED DESCRIPTION OF EXAMPLE EMBODIMENTS

The present invention relates to a method for reducing nitrogen oxide emissions of a diesel vehicle, as well as to a computer program set up for that and a system equipped for that.

The driving style of a driver may have an effect not only on the fuel consumption of the vehicle, but also on its pollutant emissions. For diesel vehicles, the nitrogen oxide emissions are a particularly important criterion for their environmental compatibility.

Figure 1:
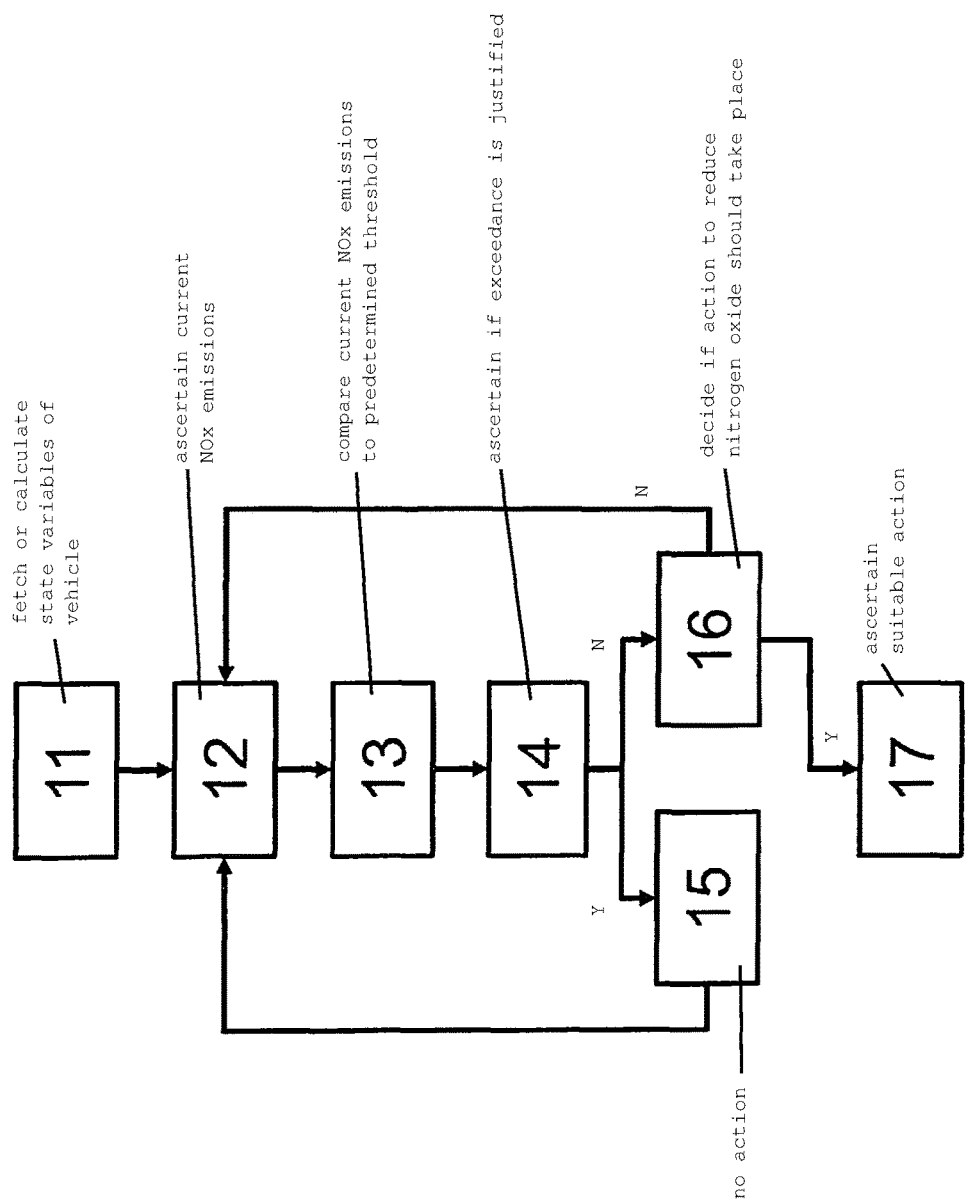
FIG. 1 shows the sequence of an exemplary method for reducing nitrogen oxide emissions of a diesel vehicle.

FIG. 1 schematically shows a method for reducing nitrogen oxide emissions of a diesel vehicle.

In a first step 11, state variables of the vehicle, which are constantly determined, are fetched out or calculated. In this context, the state variables may either be measured by sensors or determined from acquired sensor values, using model calculations and/or characteristics maps. For example, in a diesel vehicle, some or all of the following variables may be ascertained and, e.g., fetched out via an access to a control unit of the vehicle, in particular, via a CAN bus of the vehicle:
  vehicle speed
  engine speed (n)
  1st gear
  setpoint gear of a gear-shift assistant for optimizing fuel consumption
  clutch torque
  accelerator position
  boost pressure, exhaust-air temperature
  gradient of the roadway
  mass of the vehicle
  acceleration Further state variables may also be calculated from these variables, e.g.:
  longitudinal vehicle acceleration
  distance traveled
  effective mean pressure of the engine (pme)
  mass flow rate of exhaust gas
  static and dynamic, untreated NOx emissions
  vehicle mass (if not fetched out)
  gradient (if not fetched out)

Subsequently, the method preferably uses this vehicle data received in real time, in particular, engine speed, loading, vehicle speed, accelerator position, gear, and shifting selection.

In a step 12, the current NOx emissions in the case of the corresponding driving style are ascertained with the aid of an NOx characteristics map of the vehicle and a dynamic NOx emissions model.

In a step 13, the ascertained NOx emissions are compared to a predetermined threshold value, and it is ascertained if the NOx emissions exceed the predetermined threshold or are expected to exceed the predetermined threshold (that is, in particular, in response to the expected, further torque demands and the expected gear selection). Since unwanted, increased NOx emissions may already accompany exceedance of the threshold, the optional prediction function may be implemented, in order to already prevent an imminent instance of exceedance. In this connection, the time, after which the threshold threatens to be exceeded in response to the current driving style, is preferably ascertained, using the current distance from the threshold (difference from the threshold) and the temporal development of the distance or the difference, e.g., in light of a linear model. The threshold is established, in particular, with the aid of an NOx characteristics map measured beforehand at the vehicle, as a function of the current engine speed and the mean pressure of the engine, and consequently describes the boundary between acceptably small and significantly increased NOx emissions.

The magnitude and, therefore, significance of the NOx exceedance is preferably ascertained with the aid of an untreated NOx emissions model. The dynamic NOx emissions are preferably calculated with the aid of a simplified dynamic, untreated NOx emissions model. In particular, the ascertained NOx characteristics map as a function of engine speed, mean pressure, and, optionally, exhaust-gas recirculation rate, according to the characteristics map, under normal driving conditions, constitutes the basis for such a model. For example, using a PT1 element, the dynamic change in the untreated NOx emissions in response to a change in operating point is ascertained as a function of the engine speed and the mean pressure. In this connection, starting from stationary operation, the PT1 element may be supplied with values from the characteristics map. In this context, the time constant of the PT1 element may be changed as a function of the mass flow rate.

In addition, a second NOx characteristics map as a function of the engine speed, the effective mean pressure, and in the case of a reduced exhaust-gas recirculation rate, in particular, an exhaust-gas recirculation rate of 0, may be used, as required, to increase the accuracy, in order to take into account, in acceleration events, the EGR rate reduced in the process. In this case, in the acceleration state, the PT1 element is supplied with values from the second characteristics map. After a certain acceleration time, which may be ascertained in light of the accelerator position and acceleration, then, for the stationary endpoint, a switchover is made again to the first characteristics map as an input variable of the PT1 element.

In an optional step 14, it is ascertained if the occurring or predicted exceedance of the threshold on the basis of a current driving situation is justified, e.g., in order to permit starting-up or sustaining the speed in response to an increased roadway gradient or in response to an increased vehicle loading, or is necessary to regenerate a particle filter. If yes, then branching occurs in step 15, and for the moment, no action for nitrogen oxide reduction is carried out (up to a further interrogation of the function via branching to step 12). Thus, the driver or vehicle system is allowed a minimum acceleration (or a torque request put in for this, or an engaged gear), at which no measures are taken. For example, if a trip on a mountain having a steep gradient and/or with a loaded vehicle having a high mass results in an increased minimum power requirement, which is necessary for driving off or maintaining the vehicle speed, although the predetermined nitrogen oxide threshold may already be exceeded. In this case, the utilized algorithm modifies the operating point and the minimum permissible acceleration, using the acceleration or using the ascertained gradient and mass estimations and a model of the road resistances. If such a justification is not present, then the method branches to step 16.

In step 16, it is decided if an action to reduce nitrogen oxide should take place. In one preferred variant, an action is taken directly in response to the threshold being exceeded or in response to the threshold being predicted to be exceeded. Alternatively, it may also be checked if an increased nitrogen oxide emission is actually to be attributed to an increased acceleration of the vehicle by the driver, and only for this case, it may be decided that an action shall be taken. In this context, using the characteristic quantity, "acceleration," it may be determined, as a function of the gear, if the driver is carrying out a sharp acceleration operation, that is, is manipulating the accelerator pedal so intensely, that the threshold for the nitrogen oxide emissions limit is exceeded and accompanies an increased NOx emission. In a further, alternative variant, an action is first taken as of an established frequency of exceedance of the threshold or a particular degree of exceedance over a certain period of time. In this alternative variant, a value for exceeding the threshold may be stored, and the method may branch back to step 12. The method only branches to step 17, if the criteria for initiating an action are satisfied in step 16.

In step 17, a suitable action for reducing nitrogen oxide is ascertained. A gear change suitable for reducing the nitrogen oxide emissions below the threshold and/or a lowering of a torque demand to the vehicle suitable for such a reduction is preferably ascertained. To this end, the suitable action may be ascertained, in particular, in light of the characteristic quantities of actual gear, setpoint gear and acceleration.

In a first preferred variant, an action is taken at least partially automatically. In the case of an ascertained, suitable gear change, this may take place, for example, using an automatic transmission, and in the case of an ascertained reduction of the torque demand, this may take place via a corresponding limitation of the torque demand (e.g., called for by the driver, using the accelerator pedal) in a control unit of the vehicle.

In an alternative preferred variant, the ascertained action is communicated to the driver. This may be accomplished by suitable actuators in the vehicle, e.g., by an active accelerator pedal, a vibrating steering wheel, but also by acoustic signals or an indicator, e.g., by displaying a shift recommendation.

Therefore, in this variant, as soon as the driver, due to his/her driving style, goes into ranges of NOx emissions that are too high and not justified by a particular driving situation, a behavior-dependent, situational driver command may be ascertained in light of the input variables and communicated to the driver in real time on a display. Such driver commands may include, for example, "reduce the accelerator pedal position" or "shift up or down into a suitable gear." The latter command is based on a model and uses, in addition, the information of the shifting assistant, in order to equally keep the fuel consumption low. In this context, in order to prevent additional fuel consumption, it is therefore preferable for the shifting strategy of the gearshift assistant to be evaluated, as well, and to suggest this whenever it is possible and does not increase NOx.

In one preferred refinement, it is preferably ascertained initially, in light of the current gear information, if a shifting recommendation may be outputted, which may move the operating point into regions of low NOx emissions and negatively effects the ride comfort and fuel consumption as little as possible. A reduction in the torque demand, in particular, a reduced accelerator pedal position, is only recommended when that is not the case.

In addition to driving recommendations, the current NOx emissions may also be indicated to the driver, e.g., via a symbol that changes in size and/or color. This may preferably be designed such that, first of all, the driver has direct feedback as to how his/her driving style effects the NOx emissions, e.g., by changing the display as a reaction to a change of gears or a manipulation of the accelerator pedal. Secondly, using the display, but also alone, the driver may estimate how close he/she comes to the predefined NOx threshold and, consequently, when any automatic interventions in vehicle functions occur (e.g., by an active accelerator pedal or an automatic transmission) and/or when recommendations to the driver about driving behavior are to be expected. This indication of approaching or exceeding the NOx threshold may be given, e.g., by changing a symbol from green (far away from the threshold) via yellow (close to the threshold) to red (over the threshold) and/or by also drawing in the threshold next to the indicating symbol and having the symbol approach the drawn-in threshold (e.g., by changing in size), when the NOx emissions approach the predetermined NOx threshold value. For these indications, an algorithm may continuously determine the current NOx emissions and the distance from the predetermined threshold, using the current operating point (in particular, engine speed and mean pressure of the engine).

The driving style of the driver as a whole may also be evaluated, in light of the degree and number of instances of exceeding the NOx emissions threshold during a trip and/or over a particular period of time, or in light of the total NOx emissions ascertained by the NOx model, and this evaluation may be stored. In light of the evaluation, useful information regarding his/her driving style may outputted or indicated to the driver.

Figure 2:
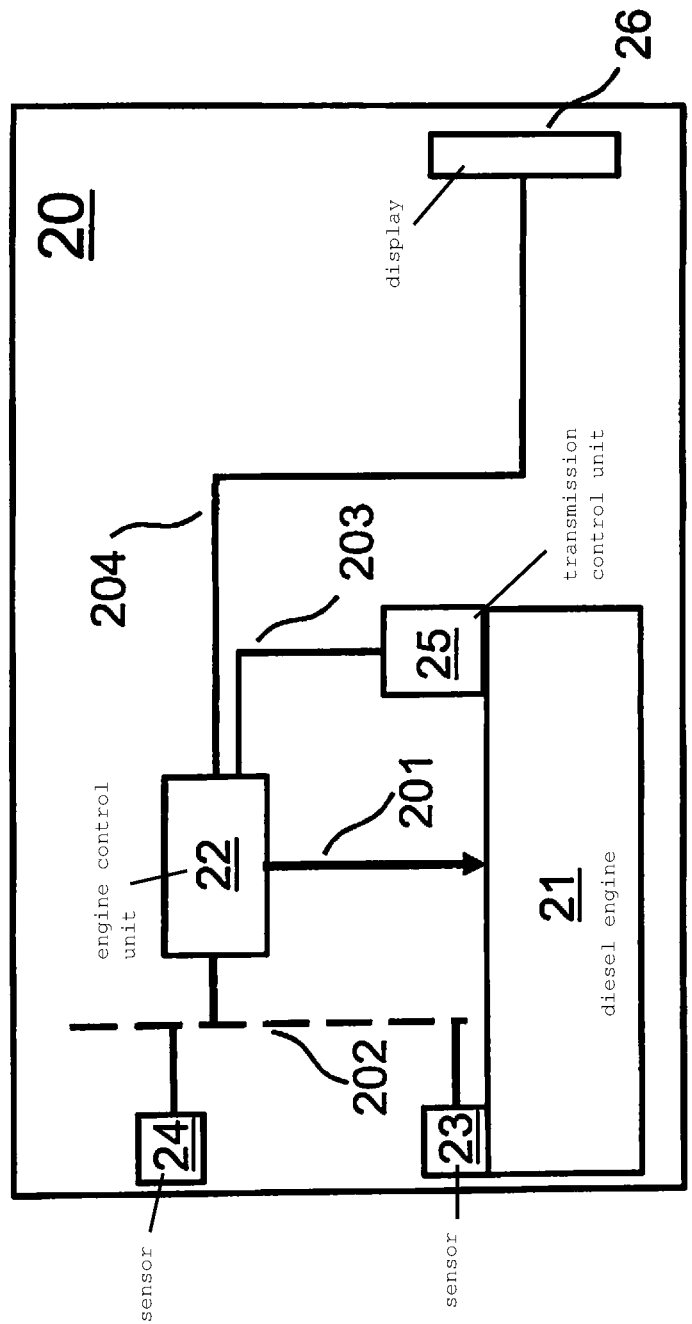
FIG. 2 shows a first exemplary system, by which methods for reducing nitrogen oxide emissions in diesel vehicles may be implemented.

FIG. 2 shows a system, by which the above-described methods may be implemented. There, a vehicle 20 having a diesel engine 21 is schematically represented. The vehicle further includes an engine control unit 22, which may carry out control functions at diesel engine 21 via connections 201. To that end, engine control unit 22 accesses state variables, which are measured, e.g., by sensors or calculated from such sensor data. For example, in FIG. 2, a sensor 23 is shown, which measures an engine state variable, as well as a further sensor 24, which measures a further vehicle state variable. Engine control unit 22 obtains the state variables measured by the sensors, via a CAN bus 202, and may calculate further state variables from them.

In order to implement a method, as is described above for reducing nitrogen oxide emissions, an arithmetic unit of control unit 22 preferably calculates, using such state variables as described above, whether or not the nitrogen oxide emissions exceed a predetermined threshold, and/or predicts such an instance of exceedance. To that end, control unit 22 may preferably access characteristics maps and models stored in storage units of control unit 22. As a result, control unit 22 ascertains, as described, if an action for reducing the nitrogen oxide emissions should take place, and if yes, which form the action should assume. As possible actions, control unit 22 may implement a torque limitation independently, initiate a shifting event of an automatic transmission via a connection 203 and a transmission control unit 25, or, for example, induce the indication of a driving recommendation to the driver by a display 26 or actuators, such as steering wheel vibration or an active accelerator pedal, in particular, the recommendation of a gear change or a reduced torque demand, e.g., via an accelerator pedal.

Figure 3:
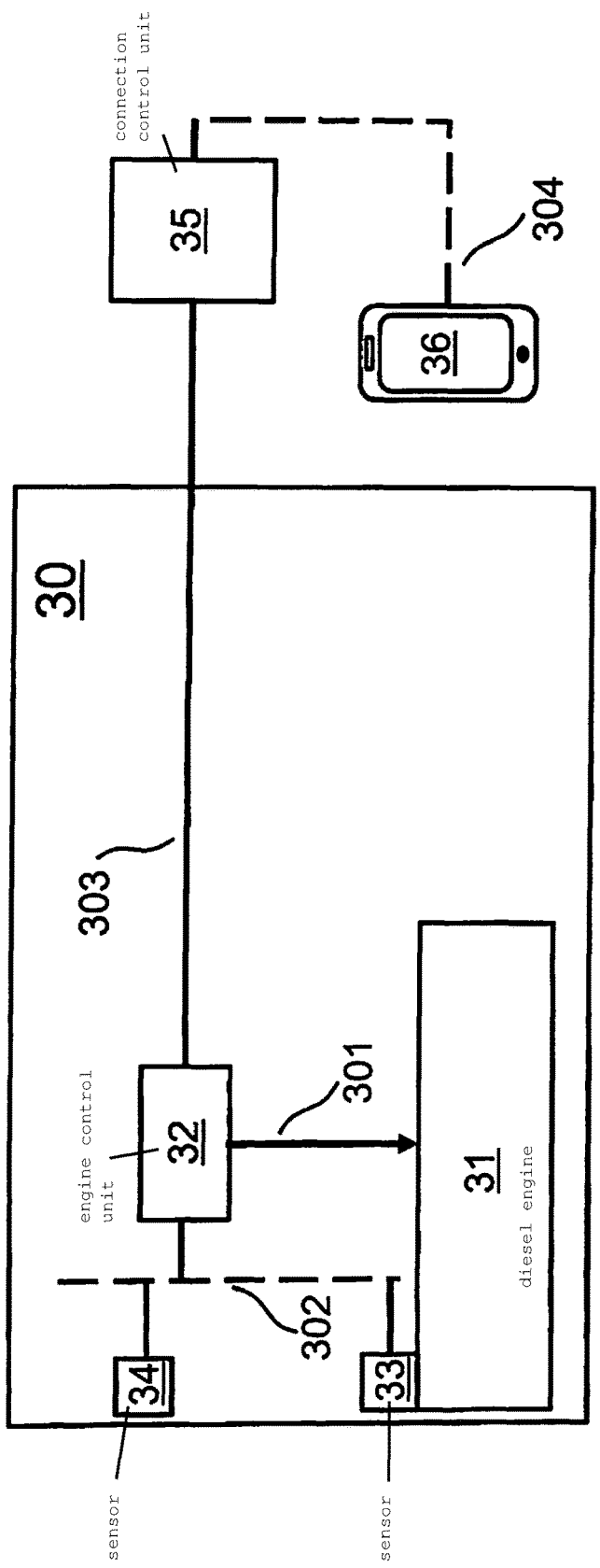
FIG. 3 shows a second exemplary system, by which methods for reducing nitrogen oxide emissions in diesel vehicles may be implemented.

FIG. 3 shows a further exemplary system, by which the above-described methods may be implemented. In this context, the elements, vehicle 30, diesel engine 31, engine control unit 32, sensor 33, sensor 34, control connections 301 and CAN bus 302 correspond to those elements 20, 21, 22, 23, 24, 201, 202 described with regard to FIG. 2. In addition, the system has a connection unit or connection control unit (CCU) 35, which includes an arithmetic unit, storage means as well as communication means.

Connection control unit 35 receives state variables from vehicle 30, preferably from engine control unit 32, via a connection 303, the state variables being measured by sensors or calculated, and being necessary for implementing the described methods. This may take place, for example, via a connection to a CAN bus or over an OBD interface. Connection control unit 35 may then ascertain if a nitrogen oxide emission exceeds a predetermined threshold value, if an action for reducing the nitrogen oxide emission should take place, and if yes, of what type the action should be.

In the system shown in FIG. 3, an action determined in such a manner is preferably communicated to the driver as a driving recommendation. To this end, connection control unit 35 has a connection 304 to a device having an HMI, in particular, a mobile arithmetic unit having a display, such as a smart phone 36. Connection 304 may, for example, take the form of a Bluetooth interface, on the side of connection control unit 35, in particular, via a Bluetooth dongle, which is connected to a USB interface of connection control unit 35. Alternatively, such a driving recommendation may also be made via a vehicle display or a navigation device.

In addition, information about the nitrogen oxide emissions and/or about proposed actions and/or about operating data connected to them may also be transmitted to a server, for example, via a GSM module of connection control unit 35 (not shown in FIG. 3).

The system shown in FIG. 3 and described for this may also be preferably used as a retrofitted solution for diesel vehicles already delivered.

What is claimed is:

1. A method for reducing nitrogen oxide emissions of a diesel vehicle, comprising:
   measuring first state variables of the diesel vehicle with the aid of sensors of the diesel vehicle, wherein the first state variables include any of the following: vehicle speed, engine speed, current gear, proposed setpoint, gear of a shifting assistant, fuel consumption, clutch torque, accelerator position, boost pressure, intake-air temperature, roadway gradient, vehicle mass, vehicle acceleration, longitudinal vehicle acceleration, distance traveled in the current operating cycle, effective mean pressure of the engine, and exhaust gas flow rate;
   one of: (i) ascertaining, as a function of the first state variables, that the nitrogen oxide emissions exceed a predetermined threshold, or (ii) predicting, as a function of the first state variables, that the nitrogen oxide emissions will exceed the predetermined threshold; and
   based on an exceedance of the predetermined threshold being ascertained or predicted, ascertaining, an intervention in at least one of: (i) a current torque demand of the diesel vehicle, (ii) a current transmission ratio of a transmission of the diesel vehicle, and (iii) a setting of the transmission of the diesel vehicle;
   wherein the intervention contributes to reducing the nitrogen oxide emissions to a value below the predetermined threshold.

2. The method as recited in claim 1, wherein the ascertained intervention is carried out automatically in the vehicle.

3. The method as recited in claim 2, wherein the intervention includes an automatic reduction of a torque demand of a driver of the diesel vehicle via a corresponding torque limitation by a control unit of the diesel vehicle.

4. The method as recited in claim 2, wherein the intervention takes place via an automatic transmission, which carries out a gear change.

5. The method as recited in claim 1, wherein the intervention includes feedback to a driver of the diesel vehicle, regarding one of a torque demand or a shifting operation, using one of: a haptic feedback by a steering wheel, an active accelerator pedal, an acoustic indication, or a display.

6. The method as recited in claim 1, wherein the ascertained intervention is indicated to a driver of the diesel vehicle as a driving recommendation.

7. The method as recited in claim 6, wherein the driving recommendation is a recommendation to change a gear or a recommendation to reduce a torque demand via an accelerator pedal position.

8. The method as recited in claim 1, wherein the diesel vehicle has an exhaust-gas aftertreatment system, and the intervention takes place exclusively or increasingly in phases, in which the exhaust-gas aftertreatment system does not function optimally due to an operating temperature.

9. The method as recited in claim 1, wherein using a first characteristics map for nitrogen oxide emissions, which was measured beforehand at the diesel vehicle, it is ascertained when the nitrogen oxide emissions exceed the predetermined threshold.

10. The method as recited in claim 9, wherein the first characteristics map is developed as a function of an engine speed and a mean pressure of the engine.

11. The method as recited in claim 9, wherein for acceleration events, a second characteristics map is used for ascertaining that the nitrogen oxide emissions exceed the predetermined threshold, the second characteristics map taking into account reduced exhaust-gas recirculation rates during an acceleration event.

12. The method as recited in claim 11, wherein the second characteristics map is developed as a function of an engine speed and a mean pressure of the engine.

13. The method as recited in claim 1, wherein at least one of a magnitude of exceedance of the predetermined threshold and a frequency of exceedance of the predetermined threshold, is calculated as a measure for a driving evaluation.

14. The method as recited in claim 13, wherein the intervention is carried out as a function of the driving evaluation.

15. The method as recited in claim 14, wherein the driving evaluation is at least one of outputted and stored.

16. The method as recited in claim 1, wherein a distance to the predetermined threshold is communicated to a driver of the diesel vehicle.

17. The method as recited in claim 16, wherein the communication occurs via a visual representation by a symbol, which changes temporally in at least one of color and size as a function of current nitrogen oxide emissions and warns the driver of an approach of the predetermined threshold from below, in response to exceedance of the predetermined threshold.

18. The method as recited in claim 1, wherein in ascertaining the intervention, negative effect on a fuel consumption of the diesel vehicle is taken into account.

19. The method as recited in claim 1, wherein no intervention occurs when at least one of a torque demand and a gear selection of the driver is necessary on the basis of the current driving situation, in response to a gradient of the roadway or an additional loading of the vehicle, for an event of starting up or maintaining the vehicle speed, even when the predetermined threshold is exceeded in the process.

20. A non-transitory computer-readable storage medium on which is stored a computer program for reducing nitrogen oxide emissions of a diesel vehicle, the computer program, when executed by a computer, causing the computer to perform:
- measuring first state variables of the diesel vehicle with the aid of sensors of the diesel vehicle, wherein the first state variables include any of the following: vehicle speed, engine speed, current gear, proposed setpoint, gear of a shifting assistant, fuel consumption, clutch torque, accelerator position, boost pressure, intake-air temperature, roadway gradient, vehicle mass, vehicle acceleration, longitudinal vehicle acceleration, distance traveled in the current operating cycle, effective mean pressure of the engine, and exhaust gas flow rate;
- one of: (i) ascertaining, as a function of the first state variables, that the nitrogen oxide emissions exceed a predetermined threshold, or (ii) predicting, as a function of the first state variables, that the nitrogen oxide emissions will exceed the predetermined threshold; and
- based on an exceedance of the predetermined threshold being ascertained or predicted, ascertaining, an intervention in at least one of: (i) a current torque demand of the diesel vehicle, (ii) a current transmission ratio of a transmission of the diesel vehicle, and (iii) a setting of the transmission of the diesel vehicle;
- wherein the intervention contributes to reducing the nitrogen oxide emissions to a value below the predetermined threshold.

21. A device, which is configured to reduce nitrogen oxide emissions of a diesel vehicle, the device configured to:
- measure first state variables of the diesel vehicle with the aid of sensors of the diesel vehicle;
- one of: (i) ascertain, as a function of the first state variables, that the nitrogen oxide emissions exceed a predetermined threshold, or (ii) predict, as a function of the first state variables, that the nitrogen oxide emissions will exceed the predetermined threshold; and
- based on an exceedance of the predetermined threshold being ascertained or predicted, ascertain, an intervention in at least one of: (i) a current torque demand of the diesel vehicle, (ii) a current transmission ratio of a transmission of the diesel vehicle, and (iii) a setting of the transmission of the diesel vehicle;
- wherein the intervention contributes to reducing the nitrogen oxide emissions to a value below the predetermined threshold.

22. The device as recited in claim 21, wherein the device is an engine control unit including a storage device, a communication device, and an arithmetic unit.

23. The device as recited in claim 21, wherein the device is a communications control unit including a storage device, a communication device and an arithmetic unit.

* * * * *